US007638195B2

(12) United States Patent
Lichtenhan et al.

(10) Patent No.: US 7,638,195 B2
(45) Date of Patent: *Dec. 29, 2009

(54) SURFACE MODIFICATION WITH POLYHEDRAL OLIGOMERIC SILSESQUIOXANES SILANOLS

(75) Inventors: Joseph D. Lichtenhan, San Juan Capistrano, CA (US); Joseph J. Schwab, Huntington Beach, CA (US); Yi-Zhong An, Irvine, CA (US); William A. Reinerth, Sr., Garden Grove, CA (US)

(73) Assignee: Hybrid Plastics, Inc., Hattiesburg, MS (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/342,240

(22) Filed: Jan. 27, 2006

(65) Prior Publication Data

US 2006/0188732 A1 Aug. 24, 2006

Related U.S. Application Data

(63) Continuation-in-part of application No. 11/255,607, filed on Sep. 12, 2005, now Pat. No. 7,553,904, which is a continuation-in-part of application No. 11/166,008, filed on Jun. 24, 2005, now abandoned, which is a continuation of application No. 09/631,892, filed on Aug. 4, 2000, now Pat. No. 6,972,312, said application No. 11/225,607 is a continuation of application No. 10/351,292, filed on Jan. 23, 2003, now Pat. No. 6,933,345, which is a continuation-in-part of application No. 09/818,265, filed on Mar. 26, 2001, now Pat. No. 6,716,919, said application No. 11/225,607 is a continuation of application No. 09/747,762, filed on Dec. 21, 2000, now Pat. No. 6,911,518, said application No. 11/225,607 is a continuation of application No. 10/186,318, filed on Jun. 27, 2002, now Pat. No. 6,927,270.

(60) Provisional application No. 60/648,327, filed on Jan. 27, 2005, provisional application No. 60/608,582, filed on Sep. 10, 2004, provisional application No. 60/147,435, filed on Aug. 4, 1999, provisional application No. 60/351,523, filed on Jan. 23, 2002, provisional application No. 60/192,083, filed on Mar. 24, 2000, provisional application No. 60/171,888, filed on Dec. 23, 1999.

(51) Int. Cl.
*B32B 17/02* (2006.01)
(52) U.S. Cl. .................... 428/405; 428/378; 428/391; 428/402
(58) Field of Classification Search .......... 428/378, 428/391, 405, 402
See application file for complete search history.

(56) References Cited

U.S. PATENT DOCUMENTS

| 2,801,968 | A | 8/1957 | Furby et al. |
|---|---|---|---|
| 3,231,499 | A | 1/1966 | Smith |
| 3,247,111 | A | 4/1966 | Oberright et al. |
| 3,278,436 | A | 10/1966 | Dazzi |
| 3,280,031 | A | 10/1966 | Brennan et al. |
| 3,292,180 | A | 12/1966 | Axworthy |
| 3,340,286 | A | 9/1967 | Schiefer et al. |
| 3,347,791 | A | 10/1967 | Thomson et al. |
| 3,673,229 | A | 6/1972 | Malec |
| 4,483,107 | A | 11/1984 | Tomoyori et al. |
| 4,513,132 | A | 4/1985 | Shoji et al. |
| 4,900,779 | A | 2/1990 | Leibfried |
| 4,946,921 | A | 8/1990 | Shirata et al. |
| 5,047,491 | A | 9/1991 | Saho et al. |
| 5,047,492 | A | 9/1991 | Weidner et al. |
| 5,190,808 | A | 3/1993 | Tenney et al. |
| 5,412,053 | A | 5/1995 | Lichtenhan et al. |
| 5,484,867 | A | 1/1996 | Lichtenhan et al. |
| 5,589,562 | A | 12/1996 | Lichtenhan et al. |
| 5,730,851 | A | 3/1998 | Arrowsmith et al. |
| 5,753,374 | A | 5/1998 | Camilletti |
| 5,830,950 | A | 11/1998 | Katsoulis et al. |
| 5,858,544 | A | 1/1999 | Banaszak Holl et al. |
| 5,888,544 | A | 3/1999 | Gergely et al. |
| 5,891,930 | A | 4/1999 | Lapin et al. |
| 5,939,576 | A | 8/1999 | Lichtenhan et al. |
| 5,942,638 | A | 8/1999 | Lichtenhan et al. |
| 6,057,256 | A | 5/2000 | Krueger et al. |
| 6,075,068 | A | 6/2000 | Bissinger |
| 6,100,417 | A | 8/2000 | Lichtenhan et al. |
| 6,194,485 | B1 | 2/2001 | Hogan et al. |
| 6,245,849 | B1 | 6/2001 | Morales et al. |

(Continued)

FOREIGN PATENT DOCUMENTS

EP 0624591 11/2004

OTHER PUBLICATIONS

International Search Report issued Aug. 8, 2007 in PCT application No. PCT/US2005/32613.
International Search Report issued Aug. 10, 2007 in PCT application No. PCT/US2006/03120.
Chevaliare, et al., "Ring Opening Olefin Metathesis Polymerisation (ROMP) as a Potential Cross-Linking Mechanism for Siloxane Polymers", *J. of Inorganic and Organmet. Polymers*, 9:3, Nov. 3, 1999.
International Search Report issued Jun. 19, 2008 for PCT/US07/18121.

*Primary Examiner*—Margaret G Moore
(74) *Attorney, Agent, or Firm*—David H. Jaffer; Pillsbury Winthrop Shaw Pittman LLP

(57) ABSTRACT

Nanoreinforced coatings with improved hydrophobicity, thermal stability, hardness, and durability have been developed from polyhedral oligomeric silsesquioxane (POSS) reagents and resins. The nanoscopic dimensions and hybrid (organic/inorganic) composition of POSS reagents are particularly useful for coating fillers derived from minerals, metals, glasses, and polymeric materials.

6 Claims, 4 Drawing Sheets

U.S. PATENT DOCUMENTS

| | | |
|---|---|---|
| 6,245,926 B1 | 6/2001 | Charrin et al. |
| 6,252,030 B1 | 6/2001 | Zanket et al. |
| 6,288,904 B1 | 8/2001 | Yadav et al. |
| 6,329,490 B1 | 12/2001 | Yamashita et al. |
| 6,425,936 B1 * | 7/2002 | Sammons et al. ............... 95/45 |
| 6,716,919 B2 | 4/2004 | Lichtenhan et al. |
| 6,770,724 B1 | 8/2004 | Lichtenhan |
| 6,838,508 B2 | 1/2005 | Hsiao et al. |
| 6,873,026 B1 * | 3/2005 | Brunemeier et al. ........ 257/508 |
| 7,013,998 B2 | 3/2006 | Ray et al. |
| 2002/0052434 A1 | 5/2002 | Lichtenhan et al. |
| 2004/0097663 A1 | 5/2004 | Deforth et al. |
| 2004/0170694 A1 | 9/2004 | Collie et al. |
| 2004/0174657 A1 | 9/2004 | Andelman et al. |
| 2004/0260085 A1 | 12/2004 | Kriesel et al. |
| 2005/0010012 A1 | 1/2005 | Jost et al. |
| 2005/0013990 A1 | 1/2005 | Cavallaro et al. |
| 2006/0104855 A1 | 5/2006 | Rothschild |

* cited by examiner

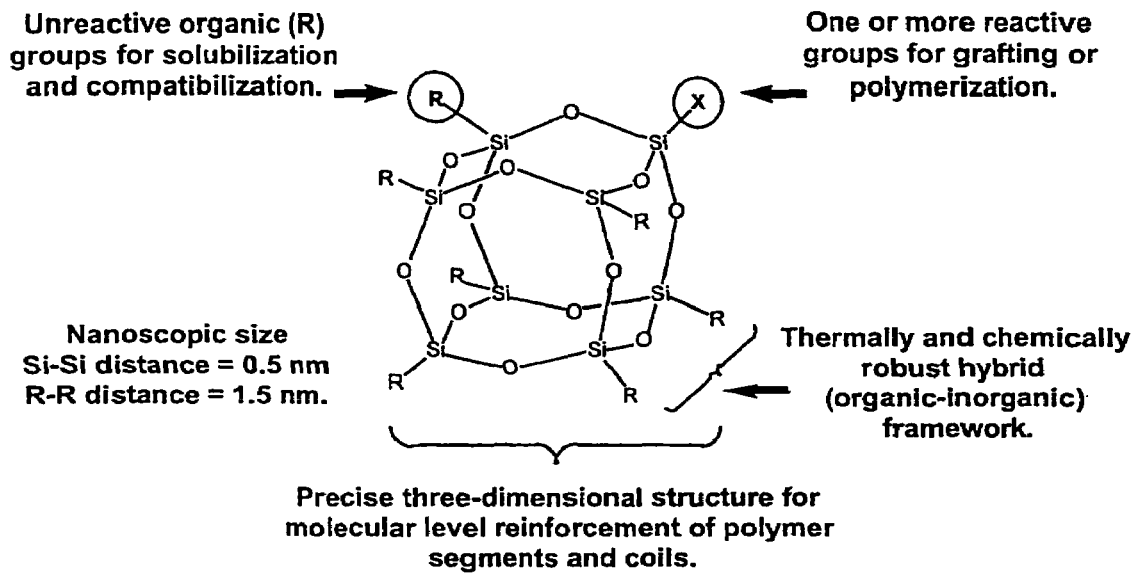
Figure 1. The anatomy of a POSS™ Nanostructured Chemical.
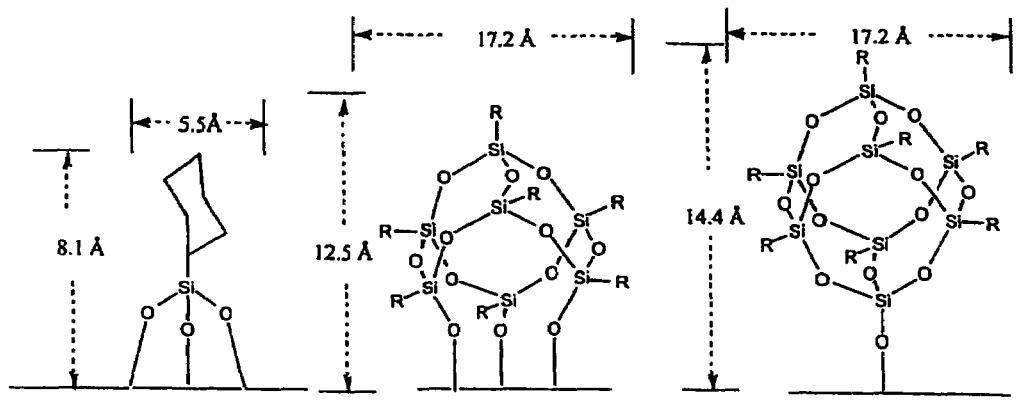
Figure 2. Physical size relationships of a traditional silane applied to a surface as a monolayer (left) and Nanostructured™ Coupling Agents applied as monolayers.

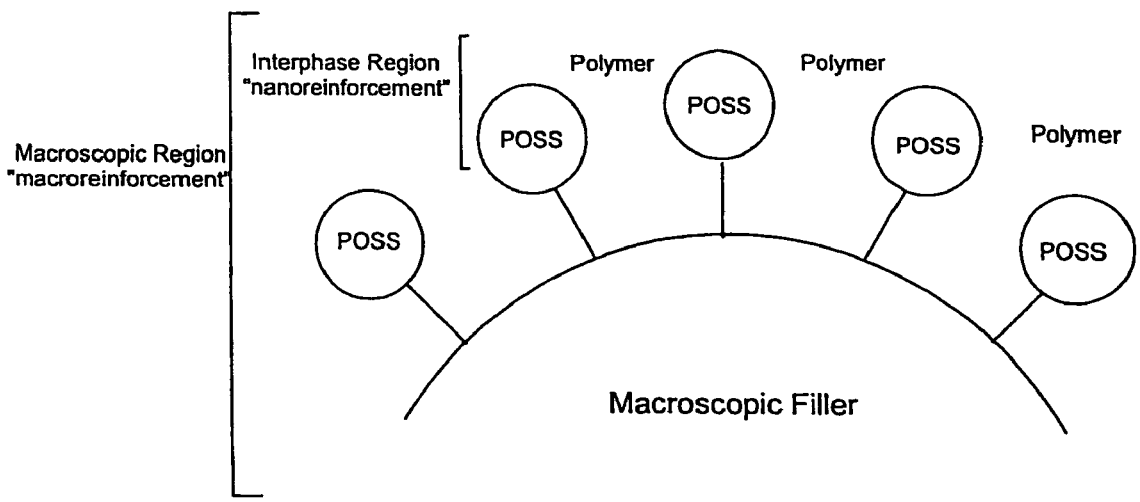
Figure 3. Multi length scale reinforcement (nano-macro) provided through POSS-surface modification of macroscopic surfaces.
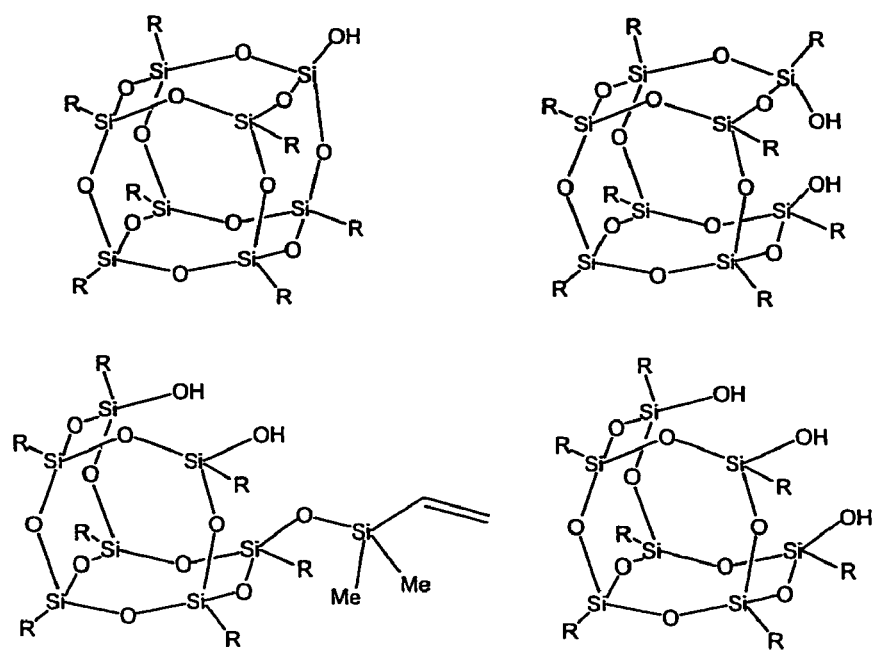
Figure 4. Structural representations and for POSS™-Silanol coupling agents R can be a functionalized group suitable for coupling to a polymer.

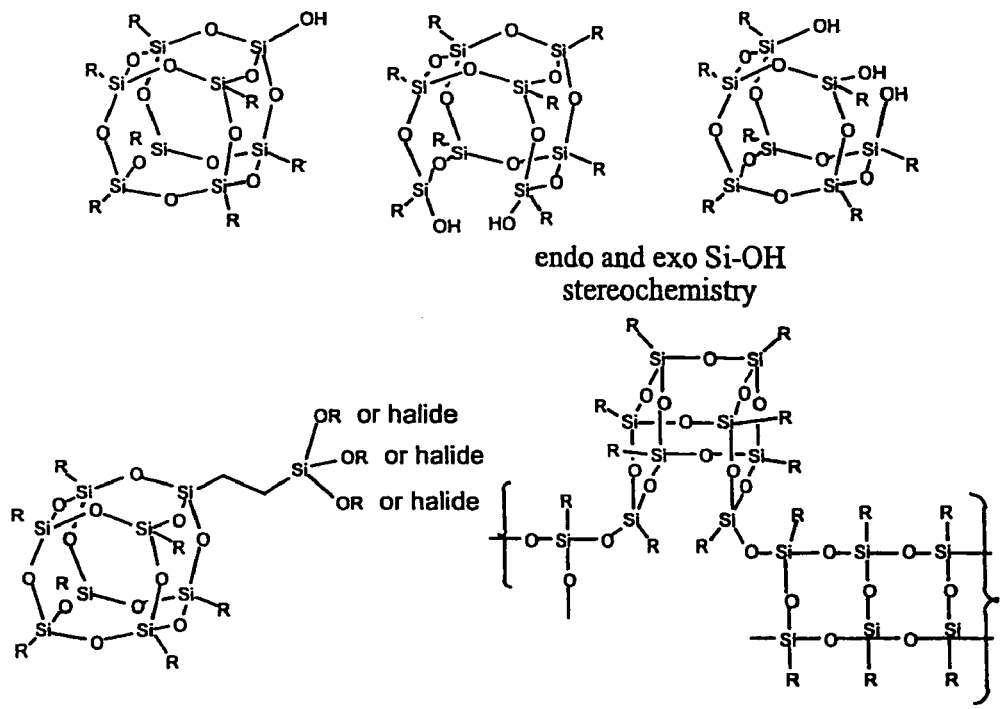
Figure 5. Examples of Nanostructured™ Surface Modification Agents that include POSS-mono, di, tri silanols, POSS-Siloxides, halides, and POSS-resins.
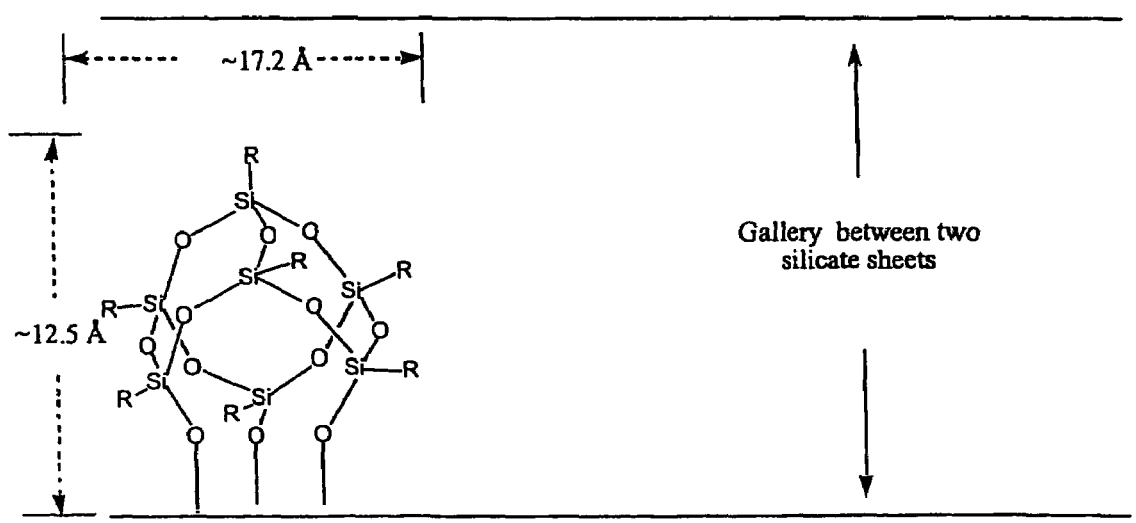
Figure 6. Representative intercalation/exfoliation of two silicate sheets by POSS.

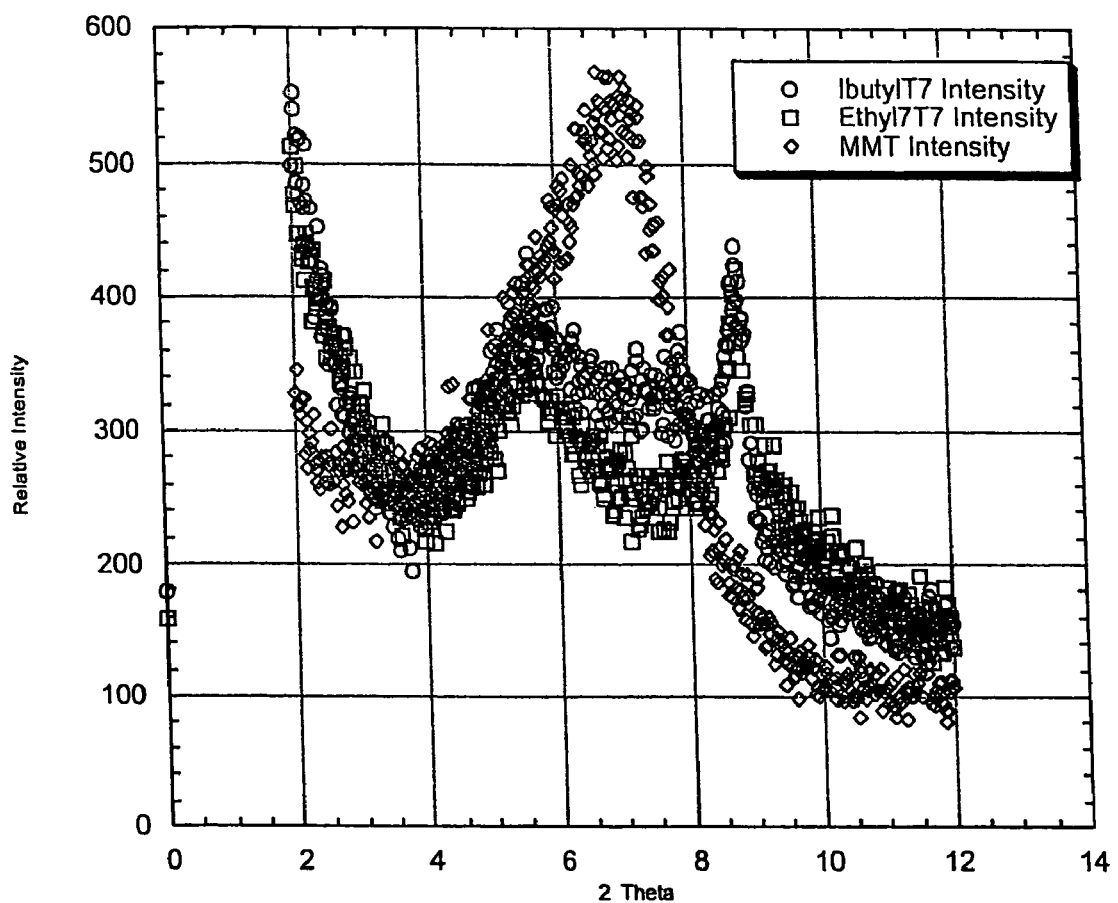
Figure 7. Selected X-ray diffraction maxima for potassium montmorillonite (MMT) and MMT exfoliated with POSS™-Silanols.

SURFACE MODIFICATION WITH POLYHEDRAL OLIGOMERIC SILSESQUIOXANES SILANOLS

This application claims the benefit of U.S. Provisional Patent Application Ser. No. 60/648,327 filed Jan. 27, 2005, and is a continuation-in-part of U.S. patent application Ser. No. 11/225,607 filed Sep. 12, 2005 now U.S. Pat. No. 7,553,904 (which claims priority from U.S. Provisional Patent Application Ser. No. 60/608,582 filed on Sep. 10, 2004), which is a continuation-in-part of U.S. patent application Ser. No. 11/166,008 filed Jun. 24, 2005, (now abandoned), which is (a) a continuation of U.S. patent application Ser. No. 09/631,892 filed Aug. 4, 2000, now U.S. Pat. No. 6,972,312 (which claims priority from U.S. Provisional Patent Application Ser. No. 60/147,435, filed Aug. 4, 1999); (b) a continuation of U.S. patent application Ser. No. 10/351,292, filed Jan. 23, 2003, now U.S. Pat. No. 6,933,345 (which claims priority from U.S. Provisional Patent Application Ser. No. 60/351,523, filed Jan. 23, 2002), which is a continuation-in-part of U.S. patent application Ser. No. 09/818,265, filed Mar. 26, 2001, now U.S. Pat. No. 6,716,919 (which claims priority from U.S. Provisional Patent Application Ser. No. 60/192,083, filed Mar. 24, 2000); (c) a continuation of U.S. patent application Ser. No. 09/747,762, filed Dec. 21, 2000, now U.S. Pat. No. 6,911,518 (which claims priority from U.S. Provisional Patent Application Ser. No. 60/171,888, filed Dec. 23, 1999); and (d) a continuation of U.S. patent application Ser. No. 10/186,318, filed Jun. 27, 2002, now U.S. Pat. No. 6,927,270 (which claims priority from U.S. Provisional Patent Application Ser. No. 60/147,435, Aug. 4, 1999). The disclosures of the foregoing applications are incorporated herein by reference.

BACKGROUND OF THE INVENTION

This invention relates generally to nanoreinforced coatings with improved hydrophobicity, thermal stability, hardness and durability.

Significant opportunity exists for technology that can compatabilize the interfaces between dissimilar materials. Polymers in particular utilize a wide variety of inorganic materials as fillers to impart desirable electrical, thermal, mechanical and other physical properties in the final composition. The hydrocarbon composition of polymers often renders them incompatible with the inorganic composition of most filler systems. (Polymers include aliphatics, olefininic, aromatic, and heterofunctional systems (representative examples include polyethylene, polypropylene, polybutadiene, polyethers, polyimides, epoxides, acrylics, styrenics, polysulfides, polysulfones, polycarbonadtes, polyesters, polyamindes). Also included are all classes of polymers, for example glasses, semicrystalline, crystalline and elastomers. (Representative fillers include fillers such as layered silicates, clay, calcium carbonate, talc, Wollanstonite, diatomacious earth Kaloin, ATH (aluminum trihydrate), vermiculite, baryte, glass, metal, metal oxides, and wood.) It has become common practice to treat the surfaces of particulate fillers with surfactants and silane coupling agents to promote surface compatability between these disimilar material types. An extension of this practice has been to utilize silanes and surfactants as exfoliants in the gallery layers of mineral and synthetic silicates. (Mineral and synthetic silicates include bentonite, hectorite, montmorillonite.) The goal of such surface interior and exterior surface modification has been to expand the spacing between adjacent silicate sheets and to compatabilize their interior surfaces to polymers and thereby improve both their dispersion and reinforcement characteristics.

DESCRIPTION OF PRIOR ART

Although the prior art has proven to be satisfactory for a multitude of industrial applications, this art is limited in its ability to compatabilize surfaces with a discrete and well defined nanoscopic structural topology. Such control is desirable in that it would afford rational control over surface design and function. Furthermore, it would enhance surface tailorability toward improved bonding, reliability, and resistance to attack by staining agents and destruction through the presence of well defined nanotopology. Compatabilization of macroscopic surfaces (one millionth of a meter features) at the nanoscopic level (one billionth of a meter features) is desirable because it allows for increased detail of features, durability, and reinforcement of polymer chains at multiple length scales. The limitation of the prior art to provide such advantages directly results from an inability to control the surface-assembly and structure for the surface modification agents once they are placed on a filler or surface. Furthermore, the limited thermal stability of traditional surfactant treatments is a key factor that reduces the thermal and mechanical performance of clay-based nanocomposites.

The present invention describes the use of nanostructured hybrid "organic-inorganic" chemicals as interior and exterior surface treatments and exfoliants for macroscopic fillers. Prior art with nanostructured polyhedral oligomeric silsesquioxanes (POSS and spherosiloxanes) reports their utility as corrosion resistant materials but makes no mention of their application and utility in composite, nanocomposite or filler technologies in which their nanoscopic size, hybrid composition and interfacial compatabilizing properties are utilized to improved physical properties. See U.S. Pat. No. 5,888,544.

SUMMARY OF THE INVENTION

Nanoreinforced coatings with improved hydrophobicity, thermal stability, hardness, and durability have been developed from polyhedral oligomeric silsesquioxane (POSS) reagents and resins. POSS reagents bearing silanols are particularity useful for coating fillers derived from minerals, metals, glasses, and polymeric materials. The nanoscopic dimensions and hybrid (organic/inorganic) composition of POSS reagents are highly effective at improving the compatability of macroscopic and nanoscopic particulate fillers with a wide range of dissimilar materials including polymeric, biological, hydrocarbon and aqueous systems.

The preferred coating agents utilize POSS-silanols, POSS-alkoxides, POSS-chlorides, and POSS-salts. POSS nanostructures containing functionalized heteroleptic compositions corresponding to formula $[(RSiO_{1.5})_n(RXSiO_{1.0})_m]_{\Sigma\#}$ (m, n, #=even and odd integers 1-1,000; R=hydrocarbon, silane or siloxy groups; X=OH, Cl, OR) are most desired. The preferred processes for coating include solventless spraying, flame spraying, melt flowing, and vapor deposition. These processes are advantagous because they do not produce nor utilize volatile organic chemicals and hence are emission free. Alternatively, traditional solvent based methods of application can be utilized and include spin coating, dipping, painting, and spraying.

POSS reagent and resin systems are also desirably utilized in the exfoliation of layered silicates and in the compatabilization of fillers including, clay, calcium carbonate, talc, Wollanstonite, diatomacious earth Kaloin, ATH (aluminum trihydrate), vermiculite, Baryte, glass, metal, metal oxides, and wood. The resulting POSS-modified fillers exhibit improved hydrophobicity, improved dispersion and rheological properties, fire retardancy, and refractive index. POSS modification of such macro- and nanoscopic fillers afford such fillers with a multi-scale reinforcement (macro to nano) capability and thus enable the improvement of the thermal, mechanical, gas permeability and other physical properties of thermoplastic or thermoset resin systems which have ultimate utility in electronics, medical devices, sporting goods, and aerospace as coatings and structural components.

The present invention teaches the use of nanostructured POSS chemicals as surface treatments for the introduction of nanoscopic surface features onto macroscopic and nanoscopic fillers and surfaces. The nanoscopic surface features provided by the POSS agents further serve to compatabilize these fillers with the nanoscopic length scales present in polymer systems to provide multi-scale levels of reinforcement in polymeric coatings, composites and nanocomposites. The POSS-surface modification agents can be applied using all conventional coating techniques including slurry, spin-coating, painting spraying, flowing and vapor deposition. POSS-surface modification agents are readily available from commercial silane feedstocks. The preferred structures and compositions are functionalized compositions corresponding to formula $[(RSiO_{1.5})_n(RXSiO_{1.0})_m]_{\Sigma\#}$ (m, n, #=even and odd integers 1-1,000; R=hydrocarbon, silane or siloxy groups; X=OH, Cl, OR).

BRIEF DESCRIPTION OF THE DRAWINGS

FIG. 1 shows the anatomy of a POSS nanostructured chemical.

FIG. 2 shows physical size relationships of a traditional silane applied to a surface as a monolayer (left) and nanostructured coupling agents applied as monolayers.

FIG. 3 shows multi-length scale reinforcement (nano-macro) provided through POSS-surface modification of macroscopic surfaces.

FIG. 4 shows structural representations; for POSS silanol coupling agents R can be a functionalized group suitable for coupling to a polymer.

FIG. 5 shows examples of nanostructured surface modification agents that include POSS-mono, di-, and tri-silanols; POSS-siloxides; halides; and POSS-resins.

FIG. 6 shows representative intercalation/exfoliation of two silicate sheets by POSS.

FIG. 7 shows selected X-ray diffraction maxima for potassium montmorillonite (MMT) and MMT exfoliated with POSS silanols.

DEFINITION OF FORMULA REPRESENTATIONS FOR NANOSTRUCTURES

For the purposes of understanding this invention's nanostrucured chemical compositions the following definitions for formula representations of Polyhedral Oligomeric Silsesquoxane (POSS) and Polyhedral Oligomeric Silicate (POS) nanostructures are made:

$[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma\#}$ for functionalized heteroleptic compositions (where R groups can be equivalent or inequivalent)

In all of the above R=organic substituent (H, siloxy, cyclic or linear aliphatic, aromatic, or siloxide groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n. It should be noted that $\Sigma\#$ is not to be confused as a multiplier for determining stoichiometry, as it merely describes the overall nanostructural characteristics of the system (aka cage size).

Nanostructured chemicals are defined by the following features. They are single molecules and not compositionally fluxional assemblies of molecules. They possess polyhedral geometries with well-defined three-dimensional shapes. Clusters are good examples whereas planar hydrocarbons, dendrimers and particulates are not. They have a Nanoscopic Size that ranges from approximately 0.7 nm to 5.0 nm. Hence, they are larger than small molecules but smaller than macromolecules. They have systematic chemistries that enable control over stereochemistry, reactivity and their physical properties.

DETAILED DESCRIPTION OF THE PREFERRED EMBODIMENT

A strucutural representation for nanostructured chemicals based on the class of chemicals known as polyhedral oligomeric silsesquioxanes (POSS) is shown in FIG. 1.

Their features include a unique hybrid (organic-inorganic) composition that possesses many of the desirable physical characteristics of both ceramics (thermal and oxidative stability) and polymers (processability and toughness). In addition they possess an inorganic skeleton which is externally covered by compataiblizing organic groups R and reactive groups X where R=organic substituent (H, siloxy, cyclic or linear aliphatic or aromatic groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$) isocyanate (NCO), and R. This inorganic skeleton coupled with the peripheral groups combine to form chemically precise cubic like building blocks that when applied to a surface provide a regular and well defined surface topology.

A particularly advantageous feature provided by nanostructured surface modification agents is that a single molecule is capable of providing five times the surface area coverage relative to that provided by comparable silane coupling agents applied in a hypothetical monolayer fashion. The dimensions utilized in the example in FIG. 2 are taken from single crystal X-ray data for systems where R=cyclohexyl and support this statement.

When applied to both macroscopic surfaces (fibers, fillers, particulates, etc) or to nanoscopic surfaces (nanoparticles, fillers), POSS chemicals provide a surface topology that is truly nanoscopic. Depending upon the number of surface bonding sites the POSS cages assemble themselves on the surface in a regular pattern to provide a regular pattern of nano building blocks. We have found that POSS-silanols are the most cost effective and affordable entities to be utilized as surface modifiers. POSS-silanols are also preferable as they readily react with other polar surface groups (e.g. Si—OH) to form thermally stable silicon-oxygen linkages to the surface. The assembly of POSS-mercaptos and POSS-Silanes on various surfaces has been reported.

Surface modifications using POSS-mercapto systems has been shown to be advantageous in both aiding the despersibility of fillers and in improving their interfacial comparability. When applied to surfaces nanostructured chemicals also provide the advantage of multi-length scale reinforcement. The example shown in FIG. 3 is representative of a macroscopic filler surface (milli to micron dimensioned ($10^{-3}$ to $10^{-6}$ meters)) modified with POSS-surface modification agents with nanometer dimensions of $10^{-9}$ meters. A filler (or fiber) modified in such a manner is capable of providing both macroscopic reinforcement (via particle size) and nanoscopic reinforcement via the POSS surface treatment.

An additional advantage of POSS-silanols as surface modifiers is derived from the fact that they are emission free. The nanoscopic size of POSS-silanols renders them nonvolatile as comparied to traditional silane and organic-based surfactants. The inherent stability of POSS-silanols is unique and thus eliminates the in situ production and release of volatile organic components such as alcohols or acid as is necessary to occur prior to the bonding and adhesion of a traditional silane coupling agent to a surface. Consequently POSS-silanols are also less flammable due to their lower volatility and the emissionless processing advantages.

POSS-silanols are also capable of chemically coupling two dissimilar material types together through the incorporation of reactive groups (such as vinyl, amino, epoxy, methacrylic etc.) directly onto the cage (FIG. 4). This capability is analogous to the widely known capability offered by silane coupling agents.

Surface Modification with Nanostructured POSS-Silanols

Nanostructured chemicals are part of a global nanotechnology trend (smaller, cheaper, and molecular control) that is directly impacting all aspects of business and business products.

A simple and cost-effective approach to the modification of fibers and mineral particulates is the application of nanostructured chemicals to the surfaces of these macroscopic reinforcements. This approach is analogous to the coating of surfaces with organosilanes, coupling agents, ammonium salts, or other surface modifiers. Surface modification with nanostructured chemicals, however, can be more effective at promoting compatibility, retarding moisture and in controlling coating structure which ultimately improves coating durability and reliability.

A number of POSS monomers and reagents have been developed for surface modification purposes. Such systems can be considered the nanostructural analogs to traditional silane coupling agents (FIG. 5).

POSS surface modification agents can be applied to minerals, glass, metal, ceramic, and polymeric surfaces via solution processing, melt spraying, or vapor deposition. The polar groups (e.g. silanol, silane, alkoxy, etc.) on each POSS system provide a chemical point of attachment to the filler surface while the remaining organic groups on the nanostructure render the surface hydrophobic and provide compatibility between the filler and the polymer matrix (see FIGS. 2 and 3). Additionally, the surface of such treated fillers is now suitable to interact with a polymer matrix at the nanoscopic level and thus provides nanoscopic, as well as macroscopic, reinforcement of polymer chains. The resulting multi-scale reinforcement provides broader function and value for traditional macroscopic reinforcements.

Treatment of metal surfaces with POSS technology has been shown to provide excellent corrosion resistance even at elevated temperatures while the treatment of minerals with POSS has been shown to reduce moisture uptake and improve their dispersive qualities.

Traditional silane coupling agents (e.g. $RSiX_3$) typically possess one R group and contain three functionalities that are susceptible to hydrolysis (e.g. $X=Cl$, $OCH_3$). It is common to depict the surface coverage of a coupling agent as a monolayer despite the fact that it has been shown that coupling agents applied from solutions as dilute as 0.25% are capable of depositing surface coatings that can be up to eight layers thick. It is also known that such coupling agents must be activated through hydrolysis to the intermediate silanol species (e.g. $RSi(OH)_3$) prior to bonding with the surface to be coated. This activation process results in the elimination of hazardous volatile organic components such as HCl and methanol. Nanostructured coupling agents offer significant advantages over traditional "small molecule" technology. FIG. 2 provides a comparison of the physical dimensions of a "silane monolayer" to those of a nanostructured coupling agent. It is clear from comparison of the area covered by each that the nanostructured coupling agents provide much greater hydrophobicity and increased surface coverage relative to a traditional silane monolayer.

Additional benefits include the fact that a more regular surface coverage may be achievable given that the nanostructure has a well-defined polyhedral structure as opposed to the random structure produced by multiple layers of polyfunctional silanes. Also, POSS nanostructures do not require activation through hydrolysis since POSS-silanols are air-stable, have indefinite shelf lives and can be reacted directly with the surface to be treated. Other desirable attributes obtained from the use of nanostructured POSS silane coupling agents include the ability to tailor the compatibilizing R-groups on the nanostructure to match the solubility characteristics of the resin matrix. Additionally, POSS-silanol systems can be applied in solventless fashion and therefore are free from volatile organic components (VOCs), thus eliminating emissions and exposures to the VOCs present in traditional coupling agents.

TABLE 1

Comparative summary of traditional silane coupling agents relative to nanostructured POSS coupling agents.

| Characteristic | Traditional Coupling Agent | POSS ™ Coupling Agent |
| --- | --- | --- |
| Coverage Ratios | 0.3 | 3 |
| Activation Required | Yes | No |
| Method of Application | Neat or Solution | Neat, Melt, or Solution |
| Volatility/VOC | High | Zero VOC |
| Tailorability to Matrix | Moderate | High plus tailorable to filler |
| Cost | Moderate-Low | Moderate-Low |

Intercalation/Exfoliation with POSS-Chemicals

POSS-reagents and molecular silicas are also proficient at coating the interior surfaces of minerals, and in particular layered silicates. When applied as coatings to mineral or other porous materials the POSS-entity can effectively impart greater compatability of the mineral toward selective entry and exit of gases and other molecules such as solvents, monomer and polymers. In a similar capacity both POSS-silanols and the nonreactive molecular silicas can enter the internal galleries of layered silicates and simultaneously act as a spacer and compatabilizer of the galleries to impart such materials with a greater affinity for intercalation and exfoliation by polymerizable monomers and polymer chains (FIG.

6). This enhanced compatability directly results from the compatabilizing influence of the organic R-groups located on each of the corners of the POSS cage. The ability of these R groups to enable comparability is directly derived from the principal of like dissolves like. This fundamental principal simply states that substances of like composition (or chemical potential) are more compatable than substances for dissimilar composition (chemical potential). Hence through the proper match of R substituent on the POSS-cage with the hydrocarbon composition of a polymer chain, POSS can organically modify silicates and other like materials and thereby compatabilize them with organic compositions.

The ability of POSS-silanols to effectively intercalate and ultimately exfoliate layered silicates has proven through X-ray diffraction experiments. The X-ray diffraction technique provides a sensitve measure of the layer spacing between stacked silicate sheets. The plot of incident X-ray angle relative to intensity level for potassium montmorillonite, and this same montmorillonite coated with two different POSS-trisilanols is shown in FIG. 7.

The untreated diffraction maxima for montmorillonite (MMT) corrsponds to a 2θ value of 7.14 which correlates to an gallery spacing of 12.4 Å. Treatment of the MMT with the POSS silanols of formula $[(EtSiO_{1.5})_4(Et(OH)SiO_{1.0})_3]_{\Sigma 7}$ (EthylT7) or $[(I-BuSiO_{1.5})_4(I-Bu(OH)SiO_{1.0})_3]_{\Sigma 7}$ (isobutylT7) resulted in a shifting of this maximum to a lower 2θ value of 5.94 for (EthylT7) and 2θ value of 5.86 for (isobutylT7) which corresponds to intergallery spacings of 14.96 Å and 15.10 Å respectively.

Considering that the approximate dimensions of $[(EtSiO_{1.5})_4(Et(OH)SiO_{1.0})_3]_{\Sigma 7}$ and/or $[(i-BuSiO_{1.5})_4(i-Bu(OH)SiO_{1.0})_3]_{\Sigma 7}$ nanostructures are approximately 14 Å, it can be affirmed that the increase in gallery spacing between the silicate layers of the montmorillonite was increased by the presence of POSS in the gallery. The POSS located in the gallery is bonded to the internal surfaces which include both the silicate and potassium/sodium counter cations. Note that once the gallery layers are separated to this level it is also physcially possible for non-silanol bearing POSS entities to also enter the gallery yet not bond to the interior surface. POSS molecular silicas of the formula $[(RSiO_{1.5})_n]_{\Sigma\#}$ and POSS-monomers are examples of such nonbonding penetrants/exfoliants. The additional diffraction maximum located at 2θ=8.72 for the (EthylT7) and 2θ=8.65 the (isobutylT7) systems indicates that these POSS-silanols are also present on the outer edges and surface of the montmorillonite sheets.

Method of Application and Processing

POSS-silanols, molecular silicas and POSS-resins naturally exist as low and high melting solids and as oils. They also exhibit a high degree of solubility in wide range of common solvents which include aromatics, hydrocarbons, halogenated systems and a variety of organic monomers including styrene, acrylics, ring strained and unstrained olefins, glycidals, esters, alcohols, and ethers. Their ability to melt and dissolve thus enables them to be applied using all conventional coating techniques including slurry, spin-coating, painting spraying, flowing and vapor deposition.

A typical solvent-assisted method of application involves dissolving the POSS entity in a desired solvent at a 0.1 wt % to 99 wt. % level and then placing this solution into contact with the material or surface desired to be coated. The solvent is then typically removed through evaporation and excess POSS can then be removed from the material or surface by physical wiping or by washing with additional solvent. The amount of material absorbed on the surface will vary by POSS composition, surface type and application method. Typical loadings for POSS-trisilanols on various material surfaces are shown below in Table 2.

TABLE 2

Typical loading level for various POSS-silanols on various material surfaces.

| Surface/Material | POSS ™-Trisilanol | Wt % Coated |
|---|---|---|
| Silica | $[(EthylSiO_{1.5})_4(Ethyl(HO)SiO_{1.0})_3]_{\Sigma 7}$ | 96 |
|  | $[(i-ButylSiO_{1.5})_4(i-Butyl(HO)SiO_{1.0})_3]_{\Sigma 7}$ | 69 |
|  | $[(i-OctylSiO_{1.5})_4(i-Octyl(HO)SiO_{1.0})_3]_{\Sigma 7}$ | 62 |
| Talc | $[(EthylSiO_{1.5})_4(Ethyl(HO)SiO_{1.0})_3]_{\Sigma 7}$ | 5 |
|  | $[(i-ButylSiO_{1.5})_4(i-Butyl(HO)SiO_{1.0})_3]_{\Sigma 7}$ | 4 |
|  | $[(i-OctylSiO_{1.5})_4(i-Octyl(HO)SiO_{1.0})_3]_{\Sigma 7}$ | 4 |
| Bentonite | $[(EthylSiO_{1.5})_4(Ethyl(HO)SiO_{1.0})_3]_{\Sigma 7}$ | 1 |
|  | $[(i-ButylSiO_{1.5})_4(i-Butyl(HO)SiO_{1.0})_3]_{\Sigma 7}$ | 7 |
|  | $[(i-OctylSiO_{1.5})_4(i-Octyl(HO)SiO_{1.0})_3]_{\Sigma 7}$ | 7 |
| Montmorillonite | $[(EthylSiO_{1.5})_4(Ethyl(HO)SiO_{1.0})_3]_{\Sigma 7}$ | 57 |
|  | $[(i-ButylSiO_{1.5})_4(i-Butyl(HO)SiO_{1.0})_3]_{\Sigma 7}$ | 23 |
|  | $[(i-OctylSiO_{1.5})_4(i-Octyl(HO)SiO_{1.0})_3]_{\Sigma 7}$ | 22 |

Surface Coating and Extraction Studies

Once applied to a material surface POSS-silanols have proven to exhibit excellent adhesion and durability properties. The adhesion however can be further enhanced through mild heating of the freshly treated material or surface. For example heating at temperatures as low as 120° C. enhance the bonding of POSS-silanols presumably through accelerating the bonding of polar surface groups with the reactive silicon-oxygen groups of POSS-silanols. Table 3 contains extraction data for selected materials coated with various POSS-silanols prior to and after heat treatment.

TABLE 3

Typical loading level for various POSS-Silanols on various material surfaces.

| Surface/POSS | Wt % Retained after extraction | Wt % Retained after extraction (Heat Treated) |
|---|---|---|
| Silica/$[(i-ButylSiO_{1.5})_4(i-Butyl(HO)SiO_{1.0})_3]_{\Sigma 7}$ | 72 | 69 |
| Talc/$[(i-ButylSiO_{1.5})_4(i-Butyl(HO)SiO_{1.0})_3]_{\Sigma 7}$ | >1 | 4 |
| Bentonite/$[(i-ButylSiO_{1.5})_4(i-Butyl(HO)SiO_{1.0})_3]_{\Sigma 7}$ | 12 | 7 |
| Montmorillonite/$[(i-ButylSiO_{1.5})_4(i-Butyl(HO)SiO_{1.0})_3]_{\Sigma 7}$ | 28 | 23 |

EXAMPLE

Solvent Assisted Application Method. IsooctylPOSS-trisilanol (100 g) was dissolved in a 400 ml of dichlormethane. To this mixture was added 500 g of montmorillonite. The mixture was then stirred at room temperature for 30 minutes. The volatile solvent was then removed and recovered under vacuum. It should also be noted that supercritical fluids such as $CO_2$ can also be utilized as a replacement for flammable hydrocarbon solvents. The resulting free flowing solid may then be either used directly or subjected to mild heat treatment of approximately 120° C. prior to use. If desired the heat treated material may then be rinsed with dichloromethane to remove traces of nonbound material.

What is claimed is:

1. A method for modifying a physical property of a substrate selected from the group consisting of zeolites, synthetic and natural silicates, silicas, aluminas, minerals, natural and man-made fibers, glass, and metallic fibers, comprising coating the substrate with a nanostructured chemical selected from the group consisting of polyhedral oligomeric silsesquloxanes, polyhedral oligomeric silicates, and polymers thereof, wherein the nanostructured chemical modifies a physical property of the substrate selected from the group consisting of (a) reduced moisture absorption by the substrate and (b) enhanced compatibility with a polymer when the substrate is used as a filler material, and wherein the substrate is coated with the nanostructured chemical in a molten state, solventless processing step.

2. The method of claim 1, wherein the substrate is coated with a mixture of nanostructured chemicals.

3. The method of claim 1, wherein the nanostructure chemical intercalates the substrate.

4. The method of claim 1, wherein the nanostructure chemical exfoliates the substrate.

5. The method of claim 1 wherein the nanostructured chemical reactively bonds to the substrate.

6. The method of claim 1 wherein the nanostructured chemical non-reactively bonds to the substrate.

* * * * *